United States Patent [19]

Ishida

[11] 4,451,690
[45] May 29, 1984

[54] METHOD OF COMPENSATING A TEMPERATURE OF A THERMOPILE

[75] Inventor: Masaharu Ishida, Kyoto, Japan

[73] Assignee: Horiba, Ltd., Kyoto, Japan

[21] Appl. No.: 413,063

[22] Filed: Aug. 30, 1982

[30] Foreign Application Priority Data

Sep. 23, 1981 [JP] Japan ................................. 56-151115

[51] Int. Cl.³ .......................................... H01L 35/34
[52] U.S. Cl. ........................................ 136/201; 62/3;
  136/203; 136/225
[58] Field of Search ............... 136/201, 224, 225, 203, 136/204; 62/3

[56] References Cited

U.S. PATENT DOCUMENTS

| 4,150,552 | 4/1979 | Altman | 62/467 R |
| 4,195,234 | 3/1980 | Berman | 340/567 |
| 4,236,075 | 11/1980 | Nexo et al. | 250/543 |
| 4,253,764 | 3/1981 | Morrill | 356/318 |
| 4,301,682 | 11/1981 | Everest | 250/338 |

*Primary Examiner*—Leland A. Sebastian
*Attorney, Agent, or Firm*—Wenderoth, Lind & Ponack

[57] ABSTRACT

A heat sensitive portion is cooled or heated by Peltier's effect owing to an electric current passing through a thermopile from the outside and simultaneously said electric current passing through the thermopile is controlled in dependence upon a circumferential temperature of the thermopile. A correct temperature compensation can be achieved in a simple and inexpensive construction. In addition, a thermopile can be improved in its sensitivity.

1 Claim, 2 Drawing Figures

METHOD OF COMPENSATING A TEMPERATURE OF A THERMOPILE

BACKGROUND OF THE INVENTION

1. Field of the Invention

The present invention relates to a method of compensating a temperature of a thermopile.

A thermopile composing of a plurality of thermocouples connected in series consists of a heat sensitive portion, which is sensitive to heat irradiated from an object whose temperature is to be measured, and the standard portion maintained at the standard temperature (hereinafter referred to as merely "a circumferential temperature") such as a circumferential temperature and the like. The Seebeck's effect owing to a temperature difference between said two portions gives a detecting signal between the thermopile terminals. Thus, it is necessary to compensate a temperature since a detecting signal is changed with a change of the circumferential temperature in spite of the constant temperature of an object whose temperature is to be measured.

2. Description of the Prior Art

The conventional temperature compensating method for a thermopile was a method in which a circumferential temperature of a thermopile 1 was detected by means of a temperature detector 2, such as a thermistor and the like, and the resulting temperature signal was fed to a computing means 3, such as a differential amplifier or the like, together with a detecting signal output from said thermopile 1 so as to thereby calculate the temperature of the object, as shown in FIG. 1.

However, such a conventional method has the disadvantage that a large number of parts such as said computing means 3, preamplifiers 4 and 5 and the like are required, the system being complicated in construction, and being expensive.

SUMMARY OF THE INVENTION

It is an object of the present invention to provide a remarkably improved temperature compensating method for a thermopile, in which a temperature compensated detecting signal can be obtained directly from a thermopile without requiring the conventional computing means and the like by cooling or heating a heat sensitive portion by Peltier's effect owing to an electric current passing through said thermopile from the outside and simultaneously controlling said electric current in dependence upon a circumferential temperature of said thermopile, in view of the fundamental identity between said thermopile and Peltier's element.

DESCRIPTION OF THE PREFERRED EMBODIMENT

Figure 1:
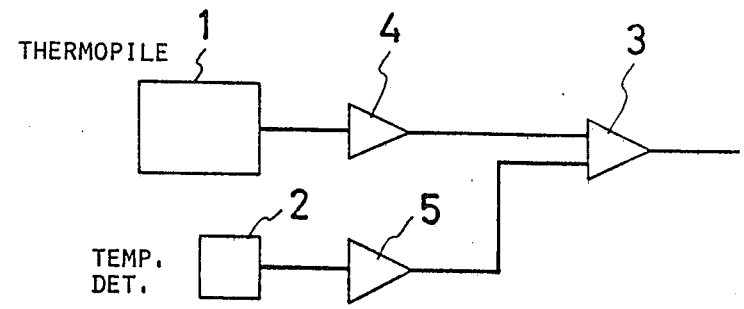
FIG. 1 is a diagram showing the conventional temperature compensating method of a thermopile.
Figure 2:
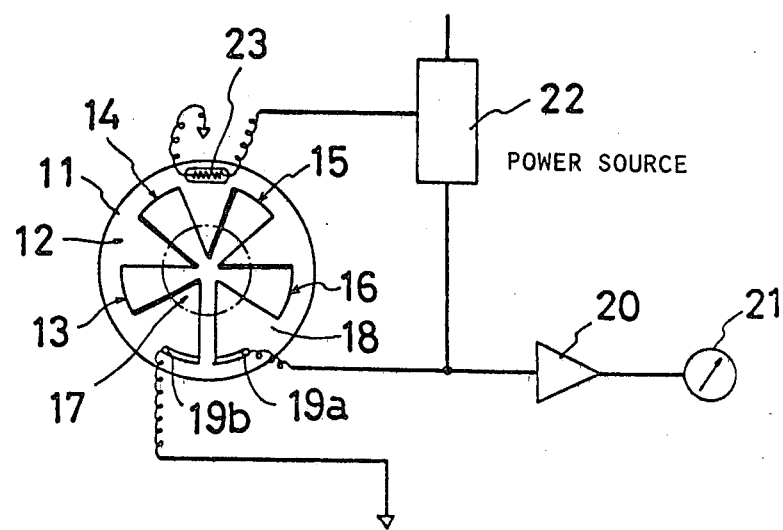
FIG. 2 is a diagram showing an example of a temperature compensating method of a thermopile according to the present invention.

A preferred embodiment of the present invention will be described below by reference to FIG. 2. Referring now to FIG. 2, numeral 11 designates a disc substrate on which a thermopile 12 is mounted. Said thermopile 12 consists of a plurality of thermocouples connected in series, for example four pairs of thermocouples 13, 14, 15, 16 connected in series in this preferred embodiment. Each thermocouple consists of different kinds of metallic wires, for example bismuth wire which are and antimony wire, connected together. Said thermopile 12 is provided with a blackened layer (a portion encircled by a dotted line in FIG. 2) having an excellent heat absorbing characteristic, which serves as a heat sensitive portion 17, at the central portion thereof. In addition, the outside circumferential portion, on which a blackened layer is not formed, is covered with a silicon substrate and the like and serves as the standard portion 18 maintained at a circumferential temperature (for example a room temperature).

Elements and 19a, 19b are output terminals of said thermopile 12 and are connected to a measuring instrument 21 such as an ammeter or the like through an amplifier 20 and are simultaneously connected to a power source 22 which is used for electrifying said thermopile 12. On the other hand, said power source 22 is connected to a temperature detecting element for detecting a circumferential temperature of said thermopile 12, for example, a thermistor 23, so that an electric current passing through said thermopile 12 may be controlled in dependence upon a circumferential temperature.

Said thermopile 12 consists of a plurality of thermocouples connected in series and so an electrifying of said thermopile 12 by said power source 22 leads to the development of Peltier's effect and thereby said heat sensitive portion 17 is cooled or heated while said standard portion 18 is heated or cooled. The heating or cooling of said standard portion 18 or cooling or heating of said heat sensitive portion 17 gives a change to the magnitude of a detecting signal output from said thermopile 12. Accordingly, a temperature compensated detecting signal can be obtained directly from said thermopile 12 by controlling an electric current passing through said thermopile 12 in dependence upon a circumferential temperature. The reason for this will be detailly described below. On the assumption that a circumferential temperature is Td and a temperature of an object to be measured is T, in the case when said thermopile 12 is not electrified, an incident energy $\phi_1$ of said heat sensitive portion 17 is expressed by Boltzmann's quadruple law as follows:

$$\phi_1 = \sigma(T^4 - Td^4) \tag{1}$$

wherein $\sigma$ is a constant. A detecting signal of a thermopile is in proportion to an incident energy $\phi_1$ and so the above described equation (1) can be deemed to be a detecting signal of a thermopile. However, in the above described case, the temperature compensation is not carried out since $\phi_1$ is dependent upon Td. On the other hand, the electrification of a thermopile leads to cooling or heating of said heat sensitive portion 17 by Peltier's effect. An incident energy of said heat sensitive portion 17 can be expressed by the following equation on the assumption that the incident energy of said heat sensitive portion 17 is $\phi_2$ and a temperature of said heat sensitive portion 17 is Td':

$$\phi_2 = \sigma(T^4 \sigma Td'^4) \tag{2}$$

wherein $$Td' = Td\,(l - IPabZ) \tag{3}$$

I is an electric current passing through a thermopile. The direction thereof, in which a heat sensitive portion is cooled while the standard portion is heated, is positive. Pab is Peltier's coefficient and Z is its thermal impedance. It is only necessary that I is a function of Td as expressed by the following equation (4) in order to maintain Td' constant independently of Td:

$$I = l/(Pab \times Z)(l - l/Td) \qquad (4)$$

Accordingly, an incident energy $\phi_2$, that is to say a detecting signal of a thermopile may be the constant temperature compensated signal which is independent of a circumferential temperature by controlling an electric current I so that it may be a factor of Td as shown by said equation (4). In addition, the control of an electric current I includes not only an increase and decrease thereof but also a cut thereof since it is not necessary to pass an electric current in the case when the circumferential temperature is equal to the standard temperature. Furthermore, in the case when the direction of an electric current I is contrary to that described above and said heat sensitive portion 17 is heated while said standard portion 18 is cooled, an incident energy $\phi_2$ is expressed by the following equation (5):

$$\phi_2 = \sigma\{T^4 - Td^4 (l + IPabZ)^4\} \qquad (5)$$

In this case, a temperature compensation of a thermopile can be carried out in the same manner as described above by controlling an electric current so that it may be expressed by the following equation (6);

$$I = \{l/(Pab \times Z)\}\{(l/Td) - l\} \qquad (6)$$

As described above, according to a temperature compensating method of the present invention, a heat sensitive portion is cooled or heated by Peltier's effect owing to an electric current passing through a thermopile from the outside and simultaneously an electric current passing through a thermopile is controlled in dependence upon a circumferential temperature. Accordingly, the following advantages can be achieved:

(1) It is remarkably simple in construction and inexpensive since a temperature compensated detecting signal can be obtained directly from a thermopile without using the separate computing means, pre-amplifier and the like which have been conventionally used in the prior art.

(2) A temperature compensation according to the present invention leads to an improvement of a thermopile in its sensitivity. That is to say, as found from the above described equations (1) and (2), although incident energies $\phi_1$ and $\phi_2$ and consequently a detecting signal of a thermopile become larger with a decrease of Td and Td' for the identical object to be measured, Td' can be decreased so as to be less than Td by suitably selecting an electric current I, Peltier's coefficient and the value of thermal impedance as shown in the equation (3). Consequently, a temperature compensated thermopile according to the present invention has a sensitivity which is superior to the conventional thermopile, which is not temperature compensated.

I claim:

1. A temperature compensating method for a thermopile, wherein a heat sensitive portion is cooled or heated by Peltier's effect owing to an electric current therethrough from the outside and said electric current passing through said thermopile is simultaneously controlled in dependence upon a circumferential temperature of said thermopile.

* * * * *